United States Patent
Shibayama et al.

(10) Patent No.: US 9,617,856 B2
(45) Date of Patent: *Apr. 11, 2017

(54) NI BASE FORGED ALLOY AND GAS TURBINE UTILIZING THE SAME

(71) Applicant: Mitsubishi Hitachi Power Systems, Ltd., Nishi-ku, Yokohama, Kanagawa (JP)

(72) Inventors: Takashi Shibayama, Hitachinaka (JP); Shinya Imano, Hitachi (JP); Hironori Kamoshida, Tsuchiura (JP); Hidetoshi Kuroki, Hitachi (JP); Jun Sato, Yasugi (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 729 days.

This patent is subject to a terminal disclaimer.

(21) Appl. No.: 13/971,460

(22) Filed: Aug. 20, 2013

(65) Prior Publication Data

US 2014/0064981 A1 Mar. 6, 2014

(30) Foreign Application Priority Data

Sep. 6, 2012 (JP) ................. 2012/195660

(51) Int. Cl.
*F01D 5/14* (2006.01)
*C22C 19/05* (2006.01)
(Continued)

(52) U.S. Cl.
CPC ............ *F01D 5/147* (2013.01); *C22C 19/055* (2013.01); *C22C 19/056* (2013.01); *F01D 5/02* (2013.01);
(Continued)

(58) Field of Classification Search
CPC ........ C22C 19/055; C22C 19/056; C22F 1/10
See application file for complete search history.

(56) References Cited

U.S. PATENT DOCUMENTS 4,359,352 A * 11/1982 Ray .................. C22C 19/05
148/409
8,864,919 B2 * 10/2014 Sato .................. C22C 19/055
148/428

(Continued)

FOREIGN PATENT DOCUMENTS

EP 1 502 966 A2 2/2005
EP 2 241 399 A1 10/2010
(Continued)

OTHER PUBLICATIONS

Holt et al., "Impurities and trace elements in nickel-base superalloys," International Metals Reviews, 1976, pp. 1-24, vol. 21, No. 1.

(Continued)

*Primary Examiner* — Jessee Roe
(74) *Attorney, Agent, or Firm* — Crowell & Moring LLP (57) ABSTRACT

An Ni base forged alloy is easy to make hot forging and miniaturization of crystal grains while excellent high-temperature strength and segregation property are compatible. The Ni base forged alloy has solid solution temperature of a precipitation strengthening phase lower than or equal to 970° C., difference in the solid solution temperature between a δ-phase and the precipitation strength phase larger than or equal to 50° C., Al of 0.5 to 1.0%, Cr of 17 to 21%, Fe of 17 to 19%, Nb of 4.5 to 5.5%, Ti of 0.8 to 1.3%, W of 3.0 to 6.0%, B of 0.001 to 0.03%, C of 0.001 to 0.1% and Mo of 1.0% or less in mass percentage [%] and remainder made of Ni and inevitable impurities.

8 Claims, 4 Drawing Sheets

(51) Int. Cl.
*F01D 5/28* (2006.01)
*F01D 5/02* (2006.01)
*F01D 5/06* (2006.01)

(52) U.S. Cl.
CPC .............. *F01D 5/066* (2013.01); *F01D 5/28* (2013.01); *F05D 2300/176* (2013.01); *Y02T 50/671* (2013.01)

(56) References Cited

U.S. PATENT DOCUMENTS

2010/0310411 A1  12/2010  Ohsaki et al.
2012/0141293 A1  6/2012   Sato et al.

FOREIGN PATENT DOCUMENTS

| EP | 2 423 342 A1 | 2/2012 |
| EP | 2 479 302 A1 | 7/2012 |
| JP | 2009-191301 A | 8/2009 |
| JP | 2012-117122 A | 6/2012 |

OTHER PUBLICATIONS

Extended European Search Report dated Nov. 22, 2013 (six (6) pages).

* cited by examiner

NI BASE FORGED ALLOY AND GAS TURBINE UTILIZING THE SAME

BACKGROUND OF THE INVENTION

The present invention relates to an Ni base forged alloy and a gas turbine utilizing the same and more particularly to the Ni base forged alloy which is excellent in the segregation property and easy in hot forging and miniaturization of crystal grains and can manufacture large-sized members and the gas turbine utilizing the same.

With high efficiency of a gas turbine, the Ni base forged alloy having the excellent high-temperature strength is used in various members. The Ni base forged alloy much contains solid solution strengthening elements such as W, Mo and Co and precipitation strengthening elements such as Al, Ti and Nb and those elements contribute to the strength of the alloy greatly. Particularly, a γ'-phase (gamma prime phase) made of $Ni_3Al$ and a γ"-phase (gamma double prime phase) made of $Ni_3Nb$ which are the precipitation strengthening phases can be precipitated to matrix phase finely and innumerably and are extremely effective in improvement of the high-temperature strength. The γ'-phase and γ"-phase are stabilized by Al, Ti and Nb and the design of the high-temperature strength in development of Ni base alloy pays the primary point to the phase stability of the precipitation strengthening phases.

However, the sold solution strengthening elements and the precipitation strengthening elements are apt to be segregated during solidification as these elements are added and it is difficult to manufacture the large-sized members. Accordingly, the use of the high-strength Ni base alloy is mainly limited to members for airplanes and small-sized components such as movable and stationary blades for land. For example, Alloy 718 is widely put to practical use as the Ni base forged alloy having more excellent high-temperature strength by the γ'-phase and γ"-phase, although the segregation property is reduced due to Nb and Mo added thereto and accordingly when it is applied to relatively large-sized members, a manufacturing method of controlling the solidification speed or the like is required. Further, in the manufacturing of large-sized material exceeding 5 tons, the solidification condition has restriction in order to continue stable operation and there are a lot of Ni base alloys to which it cannot be applied.

In JP-A-2012-117122, the segregation property of the Alloy 718 is improved. It is considered that the cause bringing about the segregation is that solute elements are distributed in solid-liquid interface unevenly, so that difference in density in molten metal is changed. The elements having the atomic weight larger and heavier than the molten metal has a tendency that the difference in density in molten metal is smaller as the addition amount is reduced and the segregation is suppressed. Conversely, the element having the light atomic weight has smaller difference in density in molten metal as the addition amount is increased and accordingly there is a tendency that the segregation is suppressed. Accordingly, elements (Al, Ti, Nb, Mo) having the segregation tendency different from one another are balanced to adjust so that the density difference in the molten metal approaches 0 and suppress the segregation, so that the excellent high-temperature strength and the manufacturing of large-sized steel lump can be compatible.

As the others, in order to improve the segregation property, there is also a method of controlling the partition coefficients of elements as described in JP-A-2009-191301. In the element having large density difference between the molten metal and the element, generation of macro segregation is promoted as the partition coefficient is separated from 1, although it has been found that the partition coefficient of particular element can be controlled by changing the addition amount of another element. In JP-A-2009-191301, it has been successfully achieved that Co is added to thereby approach the partition coefficient of W that promotes generation of macro segregation greatly to 1 as well as Al, Ti and Nb of precipitation strengthening elements.

In the above-described two patent documents, the manufacturing upon casting is improved by adjustment of components of alloy. However, in case of forged members, it is necessary to consider not only castability but also forgeability in order to manufacture large-sized steel lump. Generally, forged member is manufactured via the forging process after casting, although molding is difficult as material is larger. The molding uses a method of making forging and rolling in the heated state at high temperature, but the load required for molding is extremely increased in the large-sized high-strength member. Particularly, when the phase in which the strength is increased at high temperature as in γ'-phase in the forging temperature is left in the alloy containing a lot of precipitation strengthening elements, it is impossible to make molding due to excessive distortion resistance or forging crack is sometimes caused even if the load is sufficient. Accordingly, it is necessary to make molding at higher temperature in order to reduce the distortion resistance of material, although when the heating temperature rises, a possibility that material is partially molten and crack is formed is increased. Furthermore, it is necessary to heat material frequently in order to hold the processing temperature and processing time and heating energy are both consumed much.

Further, the forging has the effects that crystal grains are miniaturized and the fatigue strength is improved, although conversely material is held at high temperature, so that grain growth is promoted and crystal grains are coarsened. Accordingly, there is also an aspect that it is difficult to miniaturize the crystal grains in the molding at high temperature for a long time as described above and the reliability of material cannot be ensured.

SUMMARY OF THE INVENTION

It is an object of the present invention to provide an Ni base forged alloy which is easy to make hot forging and miniaturization of crystal grains while excellent high-temperature strength and segregation property are compatible.

There is provided an Ni base forged alloy having the solid solution temperature of the precipitation strengthening phase smaller than or equal to 970° C., difference in the solid solution temperature between a δ-phase and the precipitation strengthening phase larger than or equal to 50° C., Al of 0.5 to 1.0%, Cr of 17 to 21%, Fe of 17 to 19%, Nb of 4.5 to 5.5%, Ti of 0.8 to 1.3%, W of 3.0 to 6.0%, B of 0.001 to 0.03%, C of 0.001 to 0.1% and Mo of 1.0% or less in mass percentage [%] and remainder made of Ni and inevitable impurities.

According to the present invention, there can be provided the Ni base forged alloy which is easy to make hot forging and miniaturization of crystal grains while excellent high-temperature strength and segregation property are compatible.

Other objects, features and advantages of the invention will become apparent from the following description of the embodiments of the invention taken in conjunction with the accompanying drawings.

DESCRIPTION OF THE EMBODIMENTS

The present invention is now described in detail.

The present invention is effective in large-sized high-strength Ni base forged alloy having the weight larger than or equal to 2 tons and the yield stress at 500° C. larger than or equal to 1000 MPa. Particularly, when the weight thereof is 3 tons or more, more remarkable effect is attained. The addition amount of the solid solution strengthening elements and the precipitation strengthening elements which is a main cause of segregation upon casting can be adjusted so that density difference in molten metal approaches 0 to thereby be applied to large-sized members. Further, a fixed amount or more of Al, Ti and Nb is added to thereby ensure the high-temperature strength of material.

In order to improve the forgeability, it is preferable that the solid solution temperature of the precipitation strengthening phase is lower than or equal to 970° C. The general forging temperature is within the range of 900 to 1150° C., although since it takes a lot of time to forge a large-sized member as compared with a small-sized member, it is necessary to forge the large-sized member at a relatively low temperature in consideration of a possibility that crack is apt to be produced at high temperature and crystal grains are coarsened. Further, as measures of suppressing the crystal grains from being coarsened, it is effective in precipitating the δ-phase that is a grain boundary precipitate at forging temperature. The δ-phase is a phase produced by metamorphosing the γ"-phase of the metastable phase by aging at high temperature for a long time. Since precipitation to crystal grain boundary is easy, it is easy to act as pinning and it is effective in suppressing growth and coarsening of crystal grains. Accordingly, in order to improve forgeability and suppress coarsening of crystal grains compatibly, it is necessary to precipitate only the δ-phase at the forging temperature. Particularly, since the temperature of material is gradually reduced upon forging, it is preferable that difference in solid solution temperature between the δ-phase and the precipitation strengthening phase is larger than or equal to 50° C. and a fixed amount of Nb is added to thereby ensure the phase fraction of the δ-phase and adjust the solid solution temperature of the precipitation strengthening phase by Al and Ti.

The Ni base forged alloy of the present invention includes alloy components of Al of 0.5 to 1.0%, Cr of 17 to 21%, Fe of 17 to 19%, Nb of 4.5 to 5.5%, Ti of 0.8 to 1.3%, W of 3.0 to 6.0%, B of 0.001 to 0.03%, C of 0.001 to 0.1% and Mo of 1.0% or less in mass percentage (%) and the remainder made of Ni and inevitable impurities and is difficult to generate segregation in high strength and casting, excellent in hot forgeability and easy in miniaturization of crystal grains.

In the above range of components, a value of expression 1 defined by "2.20×amount of Al+1.32×amount of Ti−0.46×amount of Nb" in the mass percentage (%) is smaller than or equal to 1, so that more remarkable effect is attained. The expression 1 is a parameter for deciding the solid solution temperature of the δ-phase and the precipitation strengthening phase, and the solid solution temperatures of the δ-phase and the precipitation strengthening phase depend on the amount of Nb and on the amount of Al, Ti and Nb greatly, respectively.

Elements contained in the alloy of the present invention are described below. Composition ranges are all expressed by mass percentage (%).

Al: 0.5 to 1.0%

Al is an element forming the γ'-phase ($Ni_3Al$) and bearing strength of Ni base alloy of γ'-phase precipitation strengthening type. Further, the element also has the effect of improving oxidation resistance. When the element is lacking, the precipitation amount of the γ'-phase is reduced due to aging and accordingly sufficient high-temperature strength is not obtained. In the present invention, Ti and Nb which are other precipitation strengthening elements are contained relatively much and accordingly the precipitation strengthening effect can be obtained from about 0.5%. When the element is contained excessively, appearance of harmful phase in which the element becomes hard and fragile is promoted and the solid solution temperature of the γ'-phase is increased to reduce the hot forgeability. Accordingly, an upper Cr: 17 to 21%

Cr is an element having the surface in which minute oxide scale made of $Cr_2O_3$ is formed to improve the oxidation resistance and the high-temperature corrosion resistance. In order to utilize the element in the high-temperature member which is an object of the present invention, it is necessary to contain the element at least 17%. However, when the element is added 21% or more, the σ-phase which is harmful phase is formed to deteriorate ductility and destruction toughness of material and accordingly the element is added within the range where 21% is not exceeded.

Fe: 17 to 19%

Fe has the higher ductility as compared with Ni and improves hot workability by addition of Fe. Further, Fe is inexpensive as compared with other elements and accordingly effective even for low cost of material. However, when Fe is added excessively, the γ'-phase which is the precipitation strengthening phase is unstable and the high-temperature strength is reduced. Accordingly, the component range is set to be 17 to 19%.

Nb: 4.5 to 5.5%

Nb contributes to improvement of the high-temperature strength as the element for precipitating the γ'-phase similarly to Al and Ti, although in the present invention Nb mainly contributes to the γ"-phase ($Ni_3Nb$) having the crystal structure which is very similar to the γ'-phase. The γ"-phase acts as the precipitation strengthening phase similarly to the γ'-phase to improve the high-temperature strength of material. In order to attain this effect, it is necessary to add Nb 4.5% or more. Further, the γ″-phase is metamorphosed to the δ-phase having different crystal structure due to aging at high temperature although the composition is the same. The δ-phase has no effect of precipitation strengthening, although since the δ-phase is apt to be precipitated to crystal grain boundary, the δ-phase plays a role of pinning upon hot forging and thermal processing, so that the δ-phase is effective in suppressing the crystal gains from being coarsened.

Ti: 0.8 to 1.3%

Ti is solidly dissolved into the γ′-phase in the form of $Ni_3$ (Al, Ti) and contributes to high-temperature strength. The effect can be recognized even with small addition, although it is necessary to add Ti at least 0.8% from the point of view of improvement of segregation property. When Ti is added excessively, intermetallic compound except the γ′-phase is formed to deteriorate ductility and high-temperature workability. Furthermore, similarly to Al, the solid solution temperature of the γ′-phase is increased to deteriorate the hot forgeability and accordingly 1.3% is the upper limit.

W: 3.0 to 6.0%

W strengthens the matrix phase by solid solution strengthening. From the point of view of the segregation property, there is a tendency that the segregation property is improved as the addition amount is increased and accordingly it is necessary to add W at least 3.0%. However, when 6.0% is exceeded, production of hard and fragile intermetallic compound phase is promoted and the high-temperature forgeability is deteriorated.

B: 0.001 to 0.03%

B strengthens the grain boundary with small addition and is effective in improvement of creep strength. However, excessive addition causes precipitation of harmful phase and partial melting due to reduction in a melting point. Accordingly, its proper range is set to be 0.001 to 0.03%.

C: 0.001 to 0.1%

C is solidly dissolved into the matrix phase to improve the tension strength at high temperature and forms carbide such as MC and $M_{23}C_6$ to improve the grain boundary strength. These effects are remarkable from about 0.001%, although excessive addition of C causes coarse eutectic carbide to reduce the toughness and accordingly the upper limit is set to be 0.1%.

Mo: 1.0% or less

Mo has the influence on strength that is very similar to W and is effective in strengthening matrix phase by solid solution strengthening. Improvement of strength is recognized even with small amount and the effect thereof is increased with the addition amount. However, since the segregation property is greatly deteriorated with addition, the upper limit is set to be 1.0%.

As component elements except the above, one kind or two or more kinds of elements such as Co, Mg, Ca, Zr, Mn, Si, V, Ta and Re can be contained.

Co: 5.0% or less

Co is effective in improvement of high-temperature ductility and can be added to 5.0%. When 5% is exceeded, precipitation of embrittlement phase is promoted.

Mg: 0.1% or less and Ca: 0.1% or less

Mg and Ca may be added in order to reduce S which is harmful element in solution. However, when they are added excessively, inclusion is formed to reduce the fatigue strength and accordingly the upper limit of both is supposed to be 0.1%.

Zr: 0 to 0.05% or less

Zr is segregated on the crystal grain boundary and is effective in enhancing the grain boundary strength, although Zr almost forms nickel and intermetallic compound $Ni_3Zr$ which are main components of the alloy. This compound reduces the ductility of the alloy and has remarkably low melting point. Accordingly, the solution processing of alloy is made difficult and harmful action is increased. Hence, the upper limit is set to be 0.05% and it is preferable to be smaller than or equal to 0.01%.

Si: 0.5% or less and Mn: 0.5% or less

Si and Mn have deoxidation effect and reduce oxygen solidly dissolved in the alloy. When they are added excessively, the strengthening phase is unstable to reduce the strength and accordingly the upper limit is set to be 0.5%.

V: 0.5% or less and Ta: 0.5% or less

V and Ta can stabilize the γ′-phase and γ″-phase and be added to improve the strength, although when they are added excessively, the hot forgeability is deteriorated and accordingly the upper limit is set to be 0.5%.

Re: 0.5% or less

Re is an element which is solidly dissolved in matrix phase to strengthen solid solution and is effective in improvement of the corrosion resistance similarly to W and Mo. However, Re is expensive and its specific gravity is large to increase the specific gravity of the alloy. Accordingly, the upper limit is required to be 0.5% and it is preferable to be smaller than or equal to 0.1%.

The following component elements are inevitable impurities.

O: 0.005% or less and N: 0.005% or less

O and N are impurities and both of them are often mixed from alloy material. O is mixed even from a melting pot and exists in the alloy as oxide $Al_2O_3$ and nitrides TiN and AlN massively. When these exist in a casting, they are starting points of crack in creep deformation, so that creep rupture life is reduced and they are starting points of fatigue crack generation, so that fatigue life is reduced. It is preferable that the content of these elements is smaller, although when actual ingot is formed, these elements cannot be reduced to 0 and accordingly the upper limit of both elements is set to be 0.005% as the range in which characteristic is not deteriorated greatly.

P: 0.01% or less and S: 0.01% or less

P and S are impurities. It is preferable that these elements are as small as possible and the content of these elements is required to be suppressed to 0.01% or less.

The following experimental data is based on the result of thermodynamic simulation using database of Ni base alloy.

EMBODIMENT

Table 1 shows chemical composition of alloys (A1 to A8) of the present invention and existing alloys (B1 to B7) as comparison. The unit of numerical values is all mass percentage (%). Higher solid solution temperature is adopted as the solid solution temperature of the precipitation strengthening phase in order to precipitate two kinds of γ′-phase and γ″-phase. Difference in the solid solution temperature between the δ-phase and the precipitation strengthening phase is a value obtained by subtracting the solid solution temperature of the precipitation strengthening phase from the solid solution temperature of the δ phase.

TABLE 1

| section | No. | composition of alloys [mass %] | | | | | | | | | |
|---|---|---|---|---|---|---|---|---|---|---|---|
| | | Ni | Al | Cr | Fe | Mo | Nb | Ti | W | B | C |
| alloys of the Invention | A1 | remainder | 0.6 | 18.7 | 18.5 | 0.0 | 5.20 | 1.1 | 4.0 | 0.004 | 0.03 |
| | A2 | remainder | 065 | 19.2 | 18.5 | 0.5 | 5.20 | 1.3 | 3.6 | 0.006 | 0.03 |
| | A3 | remainder | 0.75 | 19.5 | 18.3 | 0.0 | 5.40 | 1.2 | 3.9 | 0.0037 | 0.031 |
| | A4 | remainder | 0.59 | 19 | 18.5 | 0.0 | 5.50 | 1.1 | 4.1 | 0.0035 | 0.03 |
| | A5 | remainder | 0.6 | 19 | 18.8 | 1.0 | 4.50 | 1.1 | 3.8 | 0.004 | 0.03 |
| | A6 | remainder | 0.8 | 19 | 18.5 | 0.0 | 5.00 | 0.8 | 4.5 | 0.004 | 0.02 |
| | A7 | remainder | 0.6 | 20 | 18.5 | 0.0 | 5.20 | 0.8 | 3.5 | 0.0045 | 0.03 |
| | A8 | remainder | 0.6 | 19 | 18 | 0.0 | 5.50 | 1.05 | 4.0 | 0.0042 | 0.028 |
| existing alloys | B1 | remainder | 1.0 | 19 | 18.5 | 0.0 | 5.20 | 1.05 | 4.0 | 0.004 | 0.03 |
| | B2 | remainder | 0.6 | 20 | 19.5 | 0.0 | 3.50 | 1.15 | 4.0 | 0.004 | 0.035 |
| | B3 | remainder | 0.9 | 18.5 | 18.5 | 0.0 | 5.00 | 1.1 | 5.0 | 0.0043 | 0.03 |
| | B4 | remainder | 0.8 | 19 | 18.5 | 0.5 | 4.00 | 1.5 | 3.5 | 0.004 | 0.03 |
| | B5 | remainder | 1.2 | 17 | 20 | 0.0 | 4.00 | 1.5 | 5.5 | 0.005 | 0.025 |
| | B6 | remainder | 0.8 | 18 | 18.5 | 0.0 | 5.00 | 1.7 | 4.0 | 0.003 | 0.05 |
| | B7 | remainder | 1.0 | 19 | 18 | 0.0 | 4.50 | 2 | 3.8 | 0.007 | 0.04 |

| section | No. | solid solution temperature of precipitation strengthening phase [° C.] | difference in solid solution temperature between δ-phase and precipitation strengthening phase [° C.] | phase fraction of δ-phase at solid solution temperature of precipitation strengthening phase [%] | expression 1 |
|---|---|---|---|---|---|
| alloys of the Invention | A1 | 939 | 82.3 | 8.8 | 0.38 |
| | A2 | 960 | 63.6 | 7.3 | 0.754 |
| | A3 | 963 | 60.6 | 7.4 | 0.75 |
| | A4 | 952 | 83.0 | 10.0 | 0.22 |
| | A5 | 938 | 57.7 | 6.0 | 0.702 |
| | A6 | 933 | 77.9 | 7.6 | 0.516 |
| | A7 | 952 | 84.0 | 10.6 | −0.016 |
| | A8 | 951 | 84.3 | 10.3 | 0.176 |
| existing alloys | B1 | 965 | 42.5 | 4.7 | 1.194 |
| | B2 | 939 | 20.7 | 2.1 | 1.228 |
| | B3 | 959 | 37.6 | 4.1 | 1.132 |
| | B4 | 972 | −5.3 | 0.0 | 1.9 |
| | B5 | 987 | −78.8 | 0.0 | 2.78 |
| | B6 | 982 | 10.7 | 1.5 | 1.704 |
| | B7 | 1010 | −40.3 | 0.0 | 2.77 |

Figure 1:
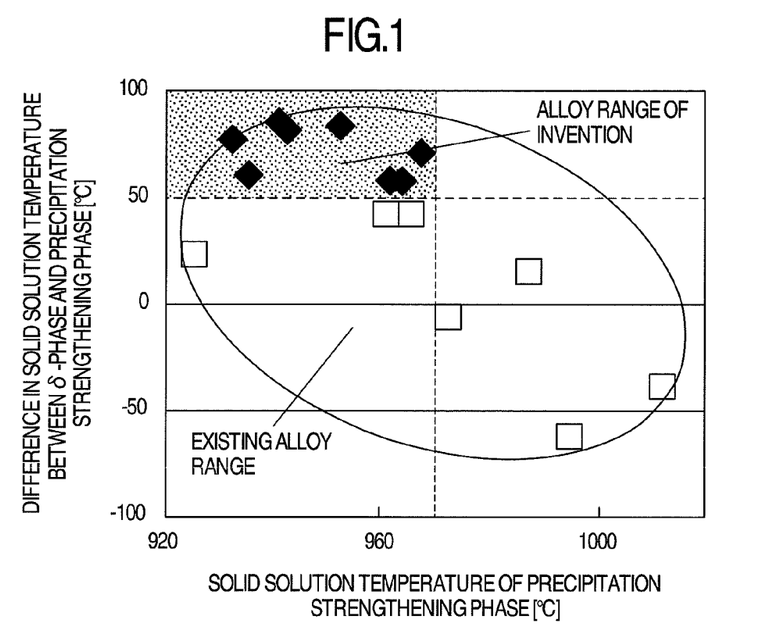
FIG. 1 is a diagram showing the relation of the solid solution temperature of the precipitation strengthening phase and the difference in the solid solution temperature between the δ-phase and the precipitation strengthening phase.

FIGS. 1, 2, 3 and 4 are graphs showing phase equilibrium calculation results in the composition of Table 1. FIG. 1 shows the relation of the solid solution temperature of the precipitation strengthening phase and the difference in the solid solution temperature between the δ-phase and the precipitation strengthening phase, and the alloys of the present invention have lower solid solution temperature of the precipitation strengthening phase as compared with the existing alloys. Particularly, when a large-sized member is subjected to hot forgeability, it is preferable that the precipitation strengthening phase which increases a distortion resistance is smaller and accordingly it is apparent that the forgeability of the alloys of the present invention is excellent. Further, since the difference in the solid solution temperature between the δ-phase and the precipitation strengthening phase is larger than or equal to 50° C., it is difficult to be influenced by precipitation strengthening due to reduction in temperature upon hot forging and forging can be made in the state that only the δ-phase is precipitated. Accordingly, the alloys of the present invention can suppress forging crack and is easy to miniaturize the crystal grains.

Figure 2:
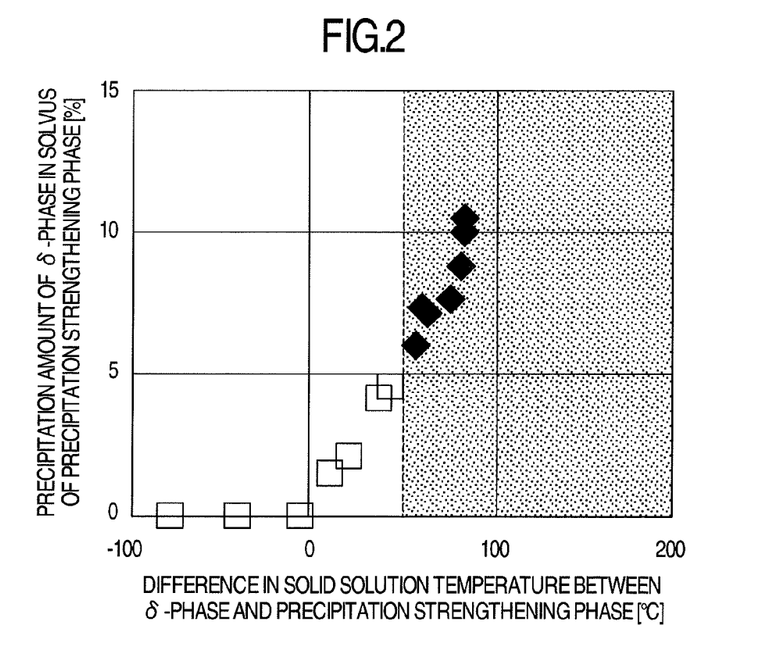
FIG. 2 is a diagram showing phase fraction of the δ-phase.

FIG. 2 shows the phase fraction of the δ-phase at the solid solution temperature of the precipitation strengthening phase and there is a tendency that the phase fraction of the δ-phase is increased as the difference in the solid solution temperature between the δ-phase and the precipitation strengthening phase is larger. The phase fraction of the δ-phase of the alloys of the present invention is larger than or equal to 5% in the stable state and the δ-phase necessary for suppression of crystal grain coarsening can be ensured even in the state where the γ″-phase of the metastable phase remains. Furthermore, since the remaining γ″-phase is metamorphosed to the δ-phase during hot forging, the effect of miniaturization of crystal grains is improved as forging is performed repeatedly. The δ-phase is apt to be precipitated to the crystal grain boundary, although the δ-phase is precipitated even into grains when the phase fraction exceeds a certain value and accordingly it is preferable that the phase fraction in the stable state is smaller than or equal to about 10%. As described above, there is the effect of suppressing the crystal grain coarsening within the range of alloys of the present invention and it is possible to manufacture the Ni base forged alloy having an average diameter of crystal grain smaller than or equal to 100 μm.

Figure 3:
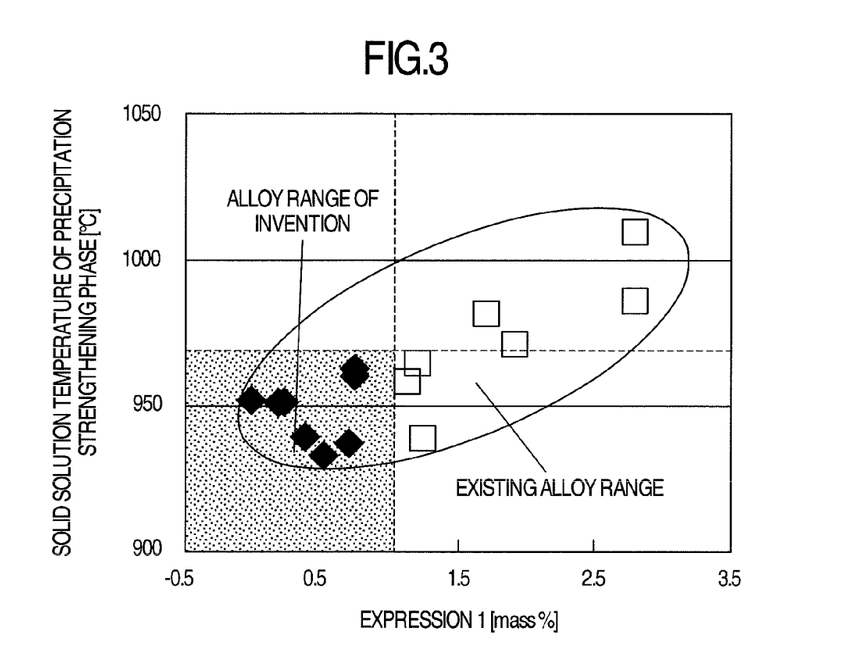
FIG. 3 is a diagram showing the relation of expression 1 and the solid solution temperature of the precipitation strengthening phase.
Figure 4:
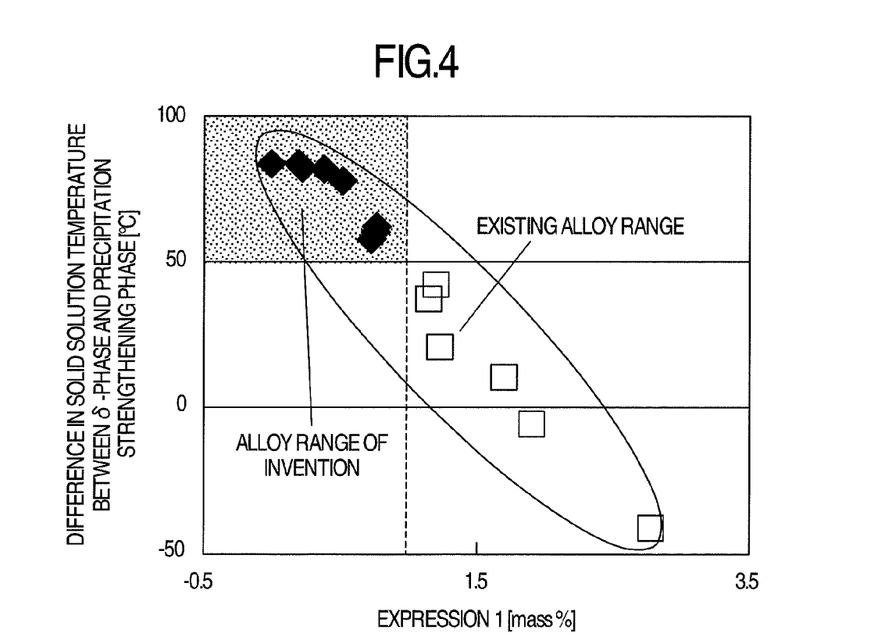
FIG. 4 is a diagram showing the relation of expression 1 and the difference in the solid solution temperature between the δ-phase and the precipitation strengthening phase.

FIGS. 3 and 4 show the relations of the solid solution temperature of the precipitation strengthening phase and difference in the solid solution temperature between the δ-phase and the precipitation strengthening phase versus the value of the expression 1 defined by "2.20×amount of Al+1.32×amount of Ti−0.46×amount of Nb", respectively. When the value of the expression 1 is smaller than or equal to 1, the solid solution temperature of the precipitation strengthening phase is lower than or equal to 970° C. and the difference in the solid solution temperature between the δ-phase and the precipitation strengthening phase is larger than or equal to 50° C., so that the effects of the present invention are satisfied sufficiently. Even in the existing alloy range, alloys (B1, B2 and B4) having the solid solution temperature of the precipitation strengthening phase lower than or equal to 970° C. are recognized, although the value of the expression 1 is larger than or equal to 1 since Nb is little as compared with Al and Ti and accordingly the difference in the solid solution temperature between the δ-phase and the precipitation strengthening phase is lower than 50° C.

Figure 5:
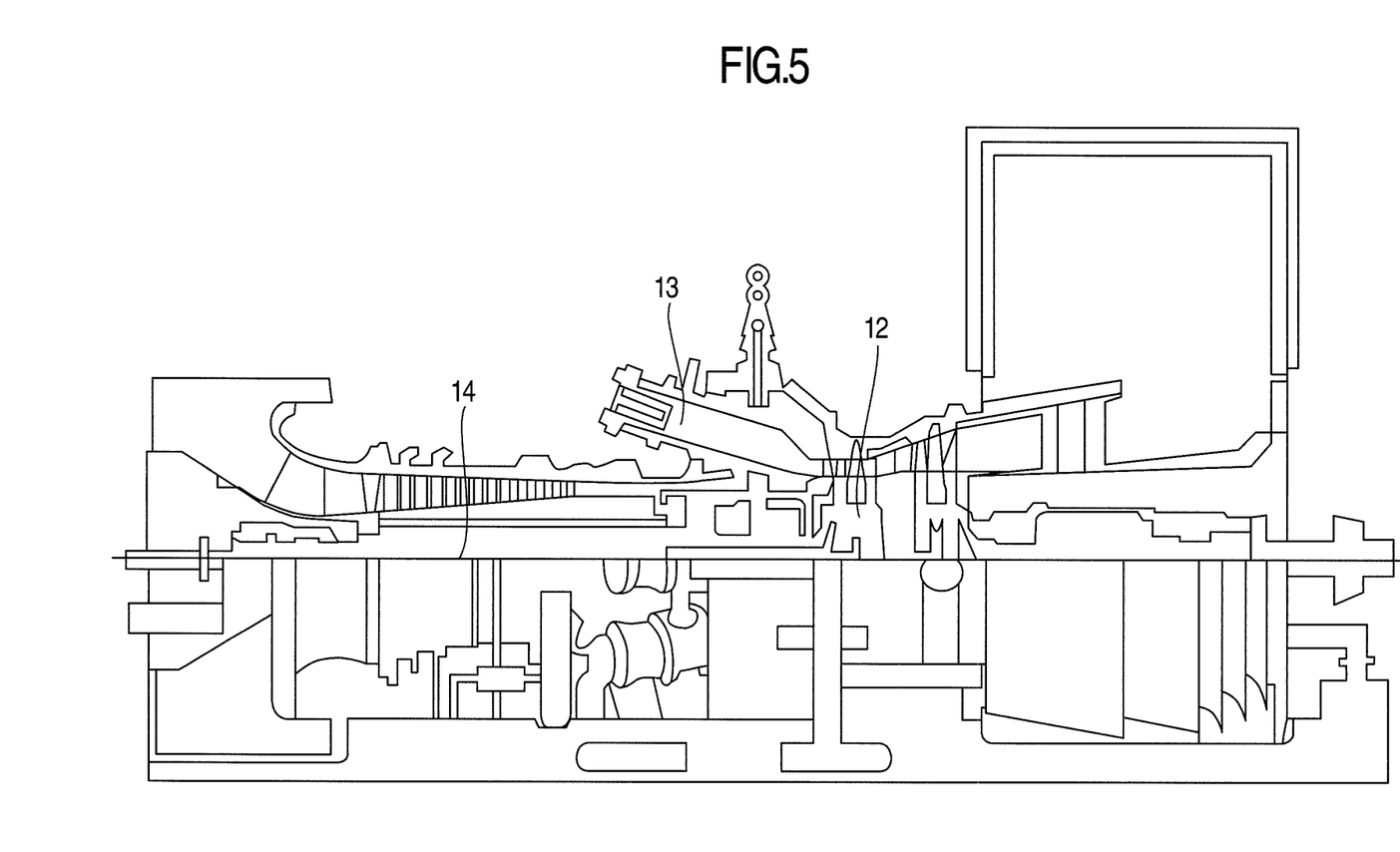
FIG. 5 is a side view showing the external appearance and the inner part of a gas turbine.
Figure 6:
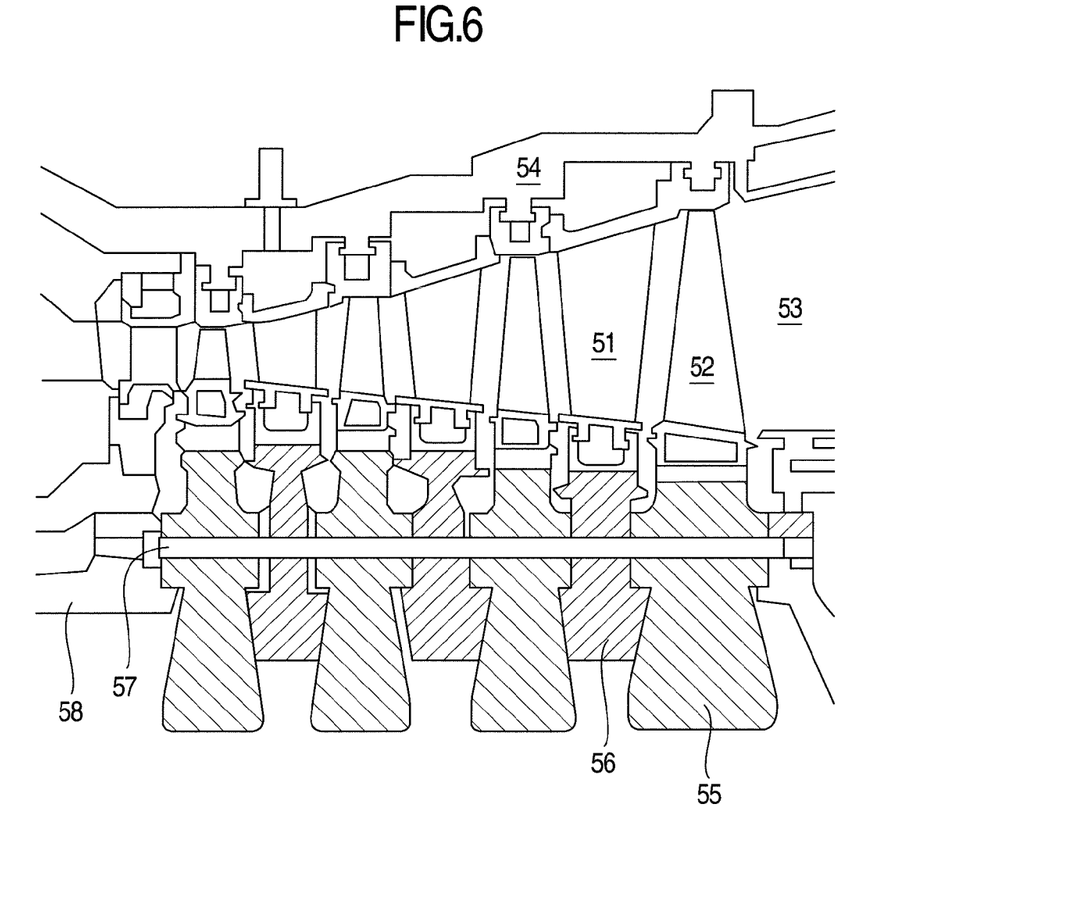
FIG. 6 is a sectional view showing a high-temperature rotation part of the gas turbine.

FIG. 5 is a schematic diagram illustrating a side of a gas turbine manufactured by the Ni base forged alloy containing the above composition elements (Al, Cr, Fe, Ni, Ti, W, B, C and Mo) and FIG. 6 is a schematic diagram illustrating a section of a high-temperature rotation part. As components used as large-sized forged member and for which the high-temperature strength is required among the above components, a turbine disk and a turbine spacer are enumerated. Since conventional material such as Alloy 718 or the like is difficult to make large-sized member, it is difficult to apply it to a large-sized turbine disk and instead it is possible to manufacture a large-sized steel lump. However, it is necessary to use material having low temperature resistance and high efficiency of the gas turbine is impeded.

The alloy of the present invention has high temperature resistance and can be used to manufacture large-sized forged member sufficient to manufacture the gas turbine disk. Accordingly, the large-sized gas turbine having output larger than or equal to 80 MW can be manufactured. Further, a high-efficient thermal power plant to which the large-sized gas turbine is applied can be realized.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An Ni base forged alloy having solid solution temperature of a precipitation strengthening phase lower than or equal to 970° C., difference in the solid solution temperature between a δ-phase and the precipitation strength phase larger than or equal to 50° C., Al of 0.5 to 1.0%, Cr of 17 to 21%, Fe of 17 to 19%, Nb of 4.5 to 5.5%, Ti of 0.8 to 1.3%, W of 3.0 to 6.0%, B of 0.001 to 0.03%, C of 0.001 to 0.1% and Mo of 1.0% or less in mass percentage [%] and remainder made of Ni and inevitable impurities.

2. An Ni base forged alloy according to claim 1, wherein a value of an expression 1 defined by "2.20×amount of Al+1.32×amount of Ti−0.46×amount of Nb" is smaller than or equal to 1.

3. An Ni base forged alloy according to claim 1, wherein an average diameter of crystal grains is smaller than or equal to 100 μm.

4. An Ni base forged alloy according to claim 1, wherein the Ni base forged alloy has weight heavier than or equal to 2 tons and yield stress at 500° C. larger than or equal to 1000 Mpa.

5. A turbine disk larger than or equal to 1 ton and processed from the Ni base forged alloy according to claim 1.

6. A gas turbine comprising the turbine disk and/or the turbine spacer according to claim 5 and having output larger than or equal to 80 MW.

7. A turbine spacer larger than or equal to 1 ton and processed from the Ni base forged alloy according to claim 1.

8. A gas turbine comprising the turbine disk and/or the turbine spacer according to claim 7 and having output larger than or equal to 80 MW.

* * * * *